Patented June 13, 1939

2,162,202

UNITED STATES PATENT OFFICE 2,162,202

PROCESS FOR THE REACTIVATION OF CLAY

George Hugo von Fuchs, Wood River, Ill., assignor to Shell Development Company, San Francisco, Calif., a corporation of Delaware No Drawing. Application May 22, 1937, Serial No. 144,308

6 Claims. (Cl. 252—2)

This invention relates to the reactivation of spent clays containing tarry adsorbed matter, used in the refining of mineral or fatty oils.

It has long been known that in order to reactivate spent clays, it is insufficient merely to extract them with a solvent for the adsorbed organic matter. Such matter is held so tenaciously by the active surface of the clay, that upon extraction with a suitable tar solvent it is dissolved very incompletely, and in order to regenerate the clay, substantially complete removal of adsorbed matter is necessary. To make it available for dissolution, it must first be displaced from the surface by a suitable displacing agent, which has a greater affinity to the clay than the adsorbed matter.

Displacing agents are roughly of two classes, depending upon whether their affinity to the adsorbent is predominantly of chemical or physical nature. Alkaline substances, as alkali hydroxides, ammonia, etc., are examples of chemical displacing agents for acidic adsorbents, salts of the acidic components of the adsorbent being formed; while as against the same adsorbents, water, various types of acids, polar organic substances, etc., may be classified as physical displacing agents.

Whereas the chemical displacing agents are in general very powerful, they have the disadvantage that they usually require a subsequent chemical treatment for their removal from the clay. Thus alkali used to reactivate acidic clays must be removed by an acid treatment. Physically acting displacing agents on the other hand, although in general not as powerful, are removed more easily, and if sufficiently volatile, can be expelled by simple heating.

Of the physical displacing agents, water has been recognized to possess highest physical affinity towards clays. Water, however, due to its lack of solvent power for organic matter such as tar, is incapable of penetrating the layer of adsorbed matter, and therefore cannot reach the active surface of the clay. Thus in spite of its high physical affinity, water has in effect proven to be a very poor displacing agent.

It is a purpose of this invention to provide a simple method which enables the use of water free of active acidic or basic chemicals, for effectively displacing adsorbed matter from spent clay, thereby reactivating at least a portion of the clay; and it is another purpose to provide a process in which properly reactivated portions of the clay can be separated from unreactivated portions in a simple manner.

The term "clay" as herein used refers to inorganic adsorbents in general, all of which possess high affinity to water, and includes adsorbent silicates such as fuller's earth, sub-bentonites, montmorillonites, acid-activated clays; silica gel, ferric hydroxide gel, bauxite, aluminum hydroxide, magnesium hydroxide, etc.

I have discovered that if I treat a spent clay with liquid water at a temperature above about 300° F., the water substantially completely displaces the adsorbed matter, so that the latter can easily be extracted with a suitable tar solvent. The quantity of water used in the treatment must be sufficient to have it distributed in the liquid state throughout the mass of clay undergoing the treatment. If desired the hydrolytic treatment may be carried out in the presence of a tar solvent. During the treatment a sufficient pressure is maintained to keep at least the water in the liquid phase and preferably both the water and the tar solvent, if the latter is present.

I am aware that spent clays have been treated with mineral acids at temperatures above their normal boiling points and under pressure sufficient to maintain them in the liquid phase. However, aside from the severe corrosion difficulties of this process, mineral acids at these elevated temperatures have strong leaching effects, which in the case of silicates not only cause removal of metal components, thereby effecting a breakdown of the silicates, but also colloidally dissolve considerable quantities of silicic acid. Both of these effects strongly tend to lower the adsorption power of the clay. Moreover, mineral acids cannot be used to reactivate spent basic adsorbents, such as bauxite, ferric hydroxide, etc., which adsorbents readily respond to my treatment with water as the displacing agent.

An upper temperature limit for my pressure hydrolytic treatment is set by the decomposition of the clay itself. It has been noted that some clays show signs of decomposition beginning at about 500° F. and possibly slightly lower, while other clays are stable at considerably higher temperatures up to about 700° F. and perhaps higher. Whether this decomposition is a dehydration, resulting in a loss of active hydroxyl radicals, or a hydrolysis which destroys the surface structure of the clay is at present unknown. As far as the efficiency of reactivation is concerned it is advantageous to operate at the highest temperature which will not result in a decomposition of the clay itself. If, moreover, the reactivation is carried out in the presence of a tar solvent, the possible decomposition of the latter must also be taken into consideration, i. e., the temperature should be low enough to avoid such decomposition which may result in the formation of absorbable polymers from the products of decomposition. Furthermore, the extremely high pressures developed at high temperatures make it desirable to shift the operating temperatures toward the lower effective limits. In general, therefore, I prefer to carry out the hydrolysis between about 400° to 550° F., under sufficient pressure to maintain water and, if possible, the tar solvent if the latter is present, in the liquid state.

The time required to complete the reactivation varies somewhat with different clays, type of adsorbed matter and the temperature of the treatment. At 300° F. several hours may be required to achieve substantial reactivation, whereas at 550° F. the reactivation may be complete in less than five minutes.

While it is not essential that the tar solvent be present during the hydrolysis, its presence is advantageous, for it is easier to wash the reactivated clay clean of the liberated tar, if the latter is dissolved as soon as released by the clay. Moreover, a peculiar separation of reactivated and unreactivated portions of the clay takes place in the presence of the tar solvent. Usually a relatively small portion of the clay, which portion may vary from about 1 to 20%, fails to respond to the reactivation treatment. This portion remains suspended in the tar solvent or accumulates as an intermediate layer at the interface of the water and the tar solvent, when the two liquids are allowed to segregate after the completion of the hydrolysis, while the reactivated portion of the clay sinks to the bottom of the water layer. The unreactivated portion may be discarded or be further reactivated by a similar hydrolytic treatment preferably at a somewhat higher temperature, or it may be added to untreated spent clay and be retreated in combination therewith.

Organic solvents which possess good tar dissolving properties, which are substantially non-miscible with water and which are relatively volatile, i. e., normally boil below about 650° F. and preferably below 550° F., are in general suitable for my process. Some solvents having the required properties may, however, be excluded because they are unstable at the high temperatures and in the presence of clay and water. For instance, chlorinated hydrocarbons, while having favorable solvent properties, tend to hydrolyze and liberate hydrochloric acid with consequent corrosion and other difficulties. Of particular utility are the normally liquid aromatic hydrocarbons of relatively low boiling temperatures as benzene, toluene, xylenes, other alkylated benzenes, tetrahydronaphthalene, alkylated naphthalenes, aromatic mineral oil fractions as cracking recycle stocks, particularly the lower boiling portions thereof, cracked naphtha, dehydrogenated naphthenic naphtha, extracts from kerosene obtained with selective solvents for non-paraffinic hydrocarbons or their products of dehydrogenation etc.; normally liquid, saturated i. e., non-olefinic, oxyhydrocarbons of 5 to 10 carbon atoms containing not more than one oxygenated radical of the group of alkoxy and carbonyl radicals, examples being mono-alcohols such as amyl alcohol, benzyl-alcohol; mono-ethers as dipropylether, anisol; simple ketones as methyl propyl ketones; fatty acids as valeric acid, etc.

The use of paraffinic hydrocarbons as pentane, hexane, paraffinic gasoline distillate, etc., having poor tar solvent properties is less desirable and results in incomplete reactivation.

Some of the solvents which are suitable in my process, if used by themselves have the ability to act as displacing agents; yet in the presence of water under the conditions of my treatment, water having the greater affinity to clays than even the most polar neutral or acidic organic substances, immediately displaces tar solvents that might be adsorbed. Thus it is seen that in effect water is the sole displacing agent in my process.

Besides containing adsorbed matter, spent clay usually contains relatively large quantities of occluded oil. It is not essential that this oil be removed prior to the hydrolytic treatment. If this oil has good tar solvent properties it may be of advantage to leave it there. In most instances, however, it is more desirable to wash it out with one of the suitable solvents hereinbefore described, or with a low boiling hydrocarbon as light naphtha, propane, butane, pentane, hexane, etc., to recover the oil. The clay which now contains light solvent is then subjected to the pressure hydrolysis with water, preferably in the presence of added amounts of tar solvent.

After completion of the hydrolysis the mixture is cooled, and the pressure is released. If a tar solvent is present, the liquids are allowed to segregate and are separated. The aqueous layer contains the reactivated clay which is most easily separated by filtration. If no tar solvent was present during the hydrolysis, the filtered cake must be washed with a suitable tar solvent to remove adhering tar, and retained solvent is expelled preferably by steaming, or if the solvent is relatively high boiling, by washing with a light hydrocarbon distillate followed by steaming. After this, the clay is ready for reuse.

The following examples serve to illustrate my process.

An acid activated clay of the sub-bentonite type (Filtrol) used in the treatment of solvent extracted bright stocks was treated in a closed autoclave with equal volumes of water and methyl isobutyl ketone at 500° F. for twenty minutes. The mixture was then cooled and allowed to separate. About 5% of the clay remained suspended in the ketone while the reactivated clay settled out. The two liquids were separated and filtered separately. The clay recovered from the settled portion and the aqueous layer was steamed and tested for decolorizing efficiency in comparison with fresh clay and clay reactivated by extraction with methyl isopropyl ketone alone. The decolorizing test consisted of heating solvent extracted bright stock with 8% of the clay to be tested to 520° F. and filtering. The following comparative results were obtained:

| Clay | A. S. T. M. color of treated lube oil |
|---|---|
| Fresh | Dark 5 |
| Fresh, but heated to 500° F | 6 |
| Spent unreactivated | Dark 8 |
| Once pressure reactivated at 500° F | 6 |
| Twice pressure reactivated at 500° F | 6 |
| Three times pressure reactivated at 500° F | 6 |
| Once solvent extracted | 7 |
| Twice solvent extracted | 7 |
| Three times solvent extracted | 7 |

The nature of the tar solvent is of some importance as is shown below. Spent clay was pressure hydrolyzed at 520° F. for twenty minutes in the presence of different tar solvents. Bright stock was decolorized as described before with the clays so reactivated, giving the following results:

| Tar solvent | A. S. T. M. color of treated lube stock |
|---|---|
| Extract distillate | 6 |
| Mid-Continent gas oil | 7 |
| Cracking cycle distillate | 6 |
| Methyl isopropyl ketone | 6 |

In another series of experiments, the colors of the decolorizing test oils were determined by a method more accurate than the A. S. T. M. method. The decolorizing efficiencies of various clays were determined in per cent of the amount of color removed by fresh clay. All the decolorizing treatments were carried out with 8% by weight of clay at 520° F. The following decolorization efficiencies of various clays were found:

| Clay | Tar solvent | Decolorizing efficiencies |
|---|---|---|
| | | Percent |
| Fresh | | 100 |
| Fresh, heated to 520° F | | 86 |
| Pressure reactivated at 520° F. | Methyl isopropyl ketone. | 92 |
| Do | Heavy cracked naphtha. | 86 |

The ratio of water to tar solvent in the above examples was about 1:1.

I claim as my invention:

1. In the process of reactivating spent decolorizing clay containing tarry adsorbed matter, the step of treating the clay with water as the sole displacing agent for the tarry adsorbed matter, in the presence of an added aromatic hydrocarbon oil capable of dissolving tar which oil is substantially immiscible with water and is resistant to decomposition under conditions of the treatment, at a temperature above 300° F. but below that at which the clay itself is materially changed, under a pressure sufficient to maintain water in the liquid state.

2. In the process of reactivating spent decolorizing clay containing tarry adsorbed matter, the steps of treating the clay with a sufficient amount of water as the sole displacing agent for the tarry adsorbed matter, in the presence of an added aromatic hydrocarbon oil capable of dissolving tar which oil is substantially immiscible with water and resistant to decomposition under the conditions of the treatment, at a temperature above 300° F. but below that at which the clay itself is materially changed, under a pressure sufficient to maintain water in the liquid state and to produce two liquid layers, an upper layer consisting predominantly of said oil containing dissolved tar and unreactivated clay in suspension, and a lower water layer containing the reactivated clay, and separating the layers.

3. In the process of reactivating spent decolorizing clay containing tarry adsorbed matter, the steps of treating the clay with a sufficient amount of water as the sole displacing agent for the tarry adsorbed matter, in the presence of an added aromatic hydrocarbon oil capable of dissolving tar which oil is substantially immiscible with water and resistant to decomposition under the conditions of the treatment, at a temperature above 300° F. but below that at which the clay itself is materially changed, under a pressure sufficient to maintain water in the liquid state, cooling the mixture and allowing it to segregate, to form two liquid layers, an upper layer consisting predominantly of said oil containing dissolved tar and unreacted clay in suspension, and a lower water layer containing the reactivated clay, and separating the layers.

4. The process of claim 2 in which the unreactivated clay is separated from the aromatic oil and is further treated with liquid water at a temperature higher than that of the first treatment.

5. The process of claim 1 in which the aromatic oil is a cracking recycle stock boiling below 650° F.

6. The process of claim 1 in which the aromatic oil is a kerosene extract obtained by extraction of kerosene with a selective solvent for non-paraffinic hydrocarbons.

GEORGE HUGO von FUCHS.